Feb. 18, 1964  E. G. BROWN  3,121,290
FISHING ROD
Filed Feb. 11, 1960
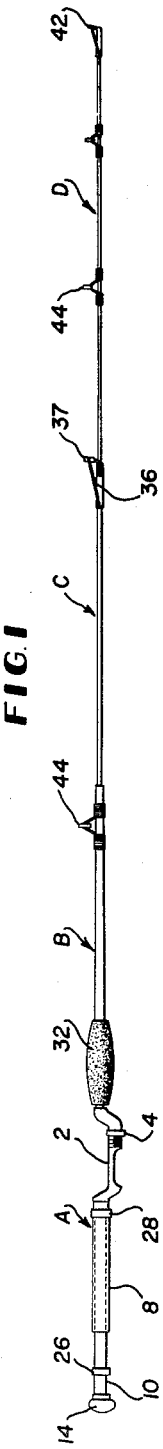
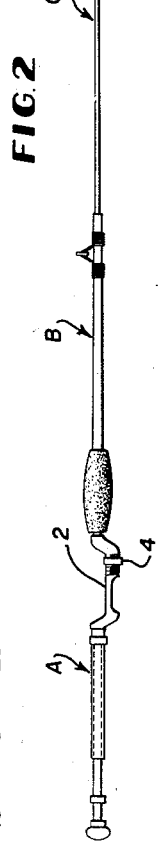
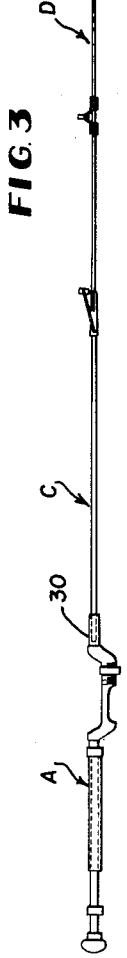
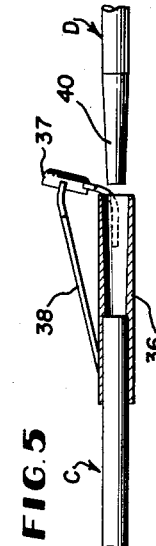
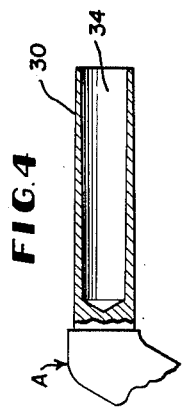
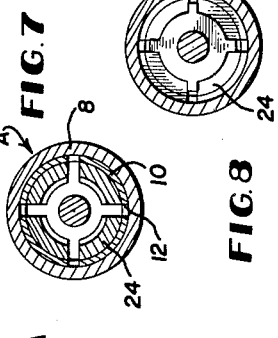
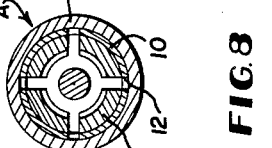
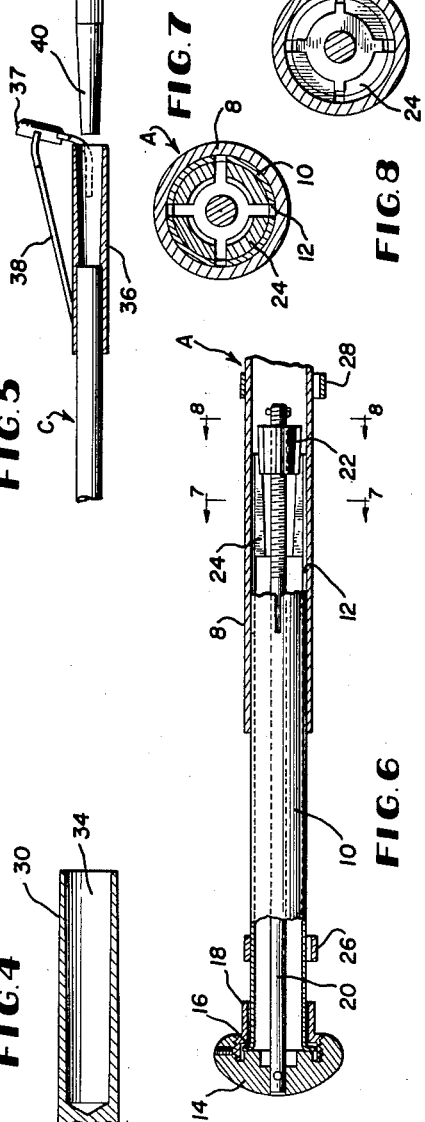
INVENTOR.
EDGAR G. BROWN
BY
ATTORNEY

United States Patent Office 3,121,290
Patented Feb. 18, 1964

3,121,290
FISHING ROD
Edgar G. Brown, 1121 Independence Ave. SE., Washington, D.C., assignor of one-fourth to Paul M. Rhodes, and one-fourth to Revere B. Gurley
Filed Feb. 11, 1960, Ser. No. 8,081
5 Claims. (Cl. 43—18)

This invention relates to fishing rods and particularly to a construction which is adapted to form different types of rods for different uses.

It is the usual practice to carry several different types of rods for different types of fishing, so that a fisherman may carry several rods if he expects to fish under different conditions. The equipment thus becomes burdensome and inconvenient, as well as expensive.

The principal object of the present invention is to provide a universal rod which may be assembled to form any type of rod which may be required for a particular use. This object is attained by constructing the rod of several sections, with provision for selectively assembling these sections to form a rod of the desired length and flexibility.

As an additional object, one section constituting the handle may be formed of variable length with provision for different reel mountings, to accommodate several types of reels.

In the drawings:

FIG. 1 shows the entire rod consisting of several sections;

FIG. 2 shows the rod with the end section omitted;

FIG. 3 shows the rod with the handle section and the two outer sections;

FIG. 4 is a detail, partly in section, of the outer end of the handle section which receives a rod section;

FIG. 5 is a view of the joint between two sections, showing the sections separated;

FIG. 6 is a view, partially in longitudinal section, of an extensible portion of the handle section;

FIG. 7 is a cross-section on line 7—7 of FIG. 6; and

FIG. 8 is a cross-section on line 8—8 of FIG. 6.

The rod is constructed of four sections A, B, C, D, which, when assembled as shown in FIG. 1, form a long rod suitable for surf casting, for example. As shown in FIG. 2, sections A, B and C may be used to form a short, stiff rod, such as used in trolling, while sections A, C and D may be used as shown in FIG. 3 to form a short, light casting rod. In some instances, only sections A and C may be used if a very short rod is desired. Any suitable material may be used, such as metal or fiberglass reinforced plastic.

The handle section A has a conventional form of reel seat indicated at 2 and provided with a threaded locking collar 4. To the rear of the reel seat 2, the handle is formed of telescoping tubular sections 8 and 10, best shown in FIG. 6, so that it may be extended as desired. Outer section 8 receives the inner section 10, which is split as indicated at 12. On the rear end of section 10, a knob 14 is rotatably mounted by flange 16 on section 10 and short sleeve 18 on the knob. A rod 20 secured to knob 10 extends through said section and is threaded at its opposite end into a wedge 22. The split ends of the section 10 carry wedges 24 fixed thereto, to be engaged by wedge 22 upon rotation of knob 14, thereby expanding the end of section 10 and effectively locking the two sections in any adjusted position.

On the telescoping sections, two loosely slidable collars 26, 28 provide a conventional locking means for securing a reel base, these collars being effective at any position along the telescoping sections in any position of extension or contraction.

At the forward end, the handle section A is formed with a substantially cylindrical or very slightly tapered portion 30. Section B is provided with a grip 32 and has a complementary socket within the grip to fit over the portion 30 of section A, forming a rigid joint between these sections. The portion 30 also has a cylindrical or slightly tapered socket therein, which is used in another form of the rod. All the joints are of conventional form, in which a cylindrical or very slightly tapered projection fits within a complementary socket.

The forward end of section B has a socket identical with socket 34 in the handle A, in which is received the rear end of section C. The rear end of section C may also be received in the socket 34, as illustrated in the assembly shown in FIG. 3.

The forward end of section C carries a socket 36, to which is fixed a line guide 37 extending laterally of the rod and slightly forward of the socket. The guide is braced at 38 and may constitute a tip when section C is the outer section or a guide when the section is an intermediate section.

A fourth section D has an end 40 formed to fit within socket 36, section D also carrying a line guide tip 42 at its outer end. All sections may also carry line guides in a conventional manner, as illustrated for example at 44.

It will be obvious that the rod shown may be assembled to form the type of rod required. The reel seat 2 may receive either a small or large casting reel, for example. The telescoping sections may be extended or shortened to provide exactly the desired form of handle. A reel, such as a spinning reel, may be secured at any point on this handle. The rod may be formed in length of two or four sections, or three sections may be selected to form a stiff, heavy rod, or a light rod.

In this way, the one rod is suitable for all kinds of fishing and for use with all types of reels.

The structure shown is for the purpose of illustrating one particular embodiment of this invention. Variations may be adopted in the construction without departing from the essential characteristics of the invention which are defined in the following claims.

I claim:

1. A fishing rod formed of a plurality of sections, one of said sections constituting a handle section and having a reel seat with reel locking means, an extensible portion rearwardly of said reel seat formed of two telescoping elements and locking means to lock said elements in any adjustable telescoped position, and reel locking collars loosely slidable on said extensible portion for securing a reel at any position on said extensible portion, a second section having a socket in the rear end frictionally receiving the forward end of said handle section and a socket in the forward end, a third section having a projecting rear end portion fitting within the socket of said forward end of said second portion, and a socket in the forward end, and a line guide tip fixed laterally outwardly of said socket and extending forwardly beyond said socket, and a fourth section having a rear end fitting within said socket of said third section, said forward end of said handle having a socket therein similar to said socket in the forward end of said second section, said third section being adapted to be received in the socket in said forward end of said handle section without said second section, and said line guide tip on said third section constituting a tip for said section when used without said fourth section, said reel seats providing for use of different types of reels.

2. A fishing rod formed of a plurality of sections, one of said sections constituting a handle section provided with a seat to receive a reel, a second section having a socket in its rear end frictionally receiving the forward end of said handle section to join said sections and also having a socket in its forward end, and a third section having its rear end frictionally fitting within said socket in the forward end of said second section, said handle section having a socket in its forward end similar to the socket in the forward end of said second section and formed to receive frictionally the rear end of said third section to join said sections.

3. A fishing rod formed of a plurality of sections, one of said sections constituting a handle section having an extensible rear portion comprising telescoping tubular elements and locking means to lock said elements in any adjustable telescoped position, and reel locking collars loosely slidable on said extensible portion for securing a reel at any position on said extensible portion in any adjusted position of said elements.

4. A fishing rod comprising a plurality of sections formed with complementary interfitting projections and sockets on adjoining ends, one of said sections constituting a handle section having a reel seat and an end portion formed integral with said section, said end portion and one end of a second section being formed with complementary interfitting socket and projection integrally formed in the respective sections for joining said second section to said end section, said second section having a socket on its opposite end, a third section having a complementary projection adapted to interfit with said socket on the opposite end of said second section, said complementary projection and socket on said third and second sections being of smaller diameter than said complementary interfitting socket and projection on said end portion and second section, said end portion also having a socket integrally formed therein the same as said socket in said opposite end of said second section so that said projection of said third section may interfit with said socket in said end portion to join third sectio nto said handle section.

5. The fishing rod defined in claim 4, in which said third section is formed with a socket in its opposite end to receive a fourth section, and a line guide extending beyond said opposite end so that it acts as a tip guide when the fourth section is not joined to said third section.

References Cited in the file of this patent

UNITED STATES PATENTS

| | | |
|---|---|---|
| 230,650 | Niswander | Aug. 3, 1880 |
| 330,985 | Kopf | Nov. 24, 1885 |
| 819,500 | Bearse | May 1, 1906 |
| 1,527,463 | Bastman | Feb. 24, 1925 |
| 2,452,788 | Peters | Nov. 2, 1948 |
| 2,620,586 | Seifert | Dec. 9, 1952 |

FOREIGN PATENTS

| | | |
|---|---|---|
| 1,055,639 | France | Oct. 14, 1953 |
| 577,615 | Great Britain | May 24, 1946 |